United States Patent [19]
Sanders

[11] Patent Number: 5,805,457
[45] Date of Patent: *Sep. 8, 1998

[54] SYSTEM FOR ANALYZING SOUND QUALITY IN AUTOMOBILES USING MUSICAL INTERVALS

[76] Inventor: David L. Sanders, 1750 Wooley Rd., Oxford, Mich. 48371

[*] Notice: The term of this patent shall not extend beyond the expiration date of Pat. No. 5,535,131.

[21] Appl. No.: 761,265

[22] Filed: Dec. 6, 1996

[51] Int. Cl.$^6$ .................................................. G01R 23/16
[52] U.S. Cl. ........................... 364/487; 364/574; 364/485
[58] Field of Search ................................... 364/487, 574, 364/484, 485, 576; 381/73.1, 86; 84/616, 681, 654, 471 R, 484; 324/76.19, 76.47, 76.55, 76.13, 76.21; 73/648, 659, 647; 455/297, 296

[56] References Cited

U.S. PATENT DOCUMENTS

| | | | |
|---|---|---|---|
| 3,844,175 | 10/1974 | Hixson | 73/557 |
| 4,377,961 | 3/1983 | Bode | 84/1.01 |
| 4,429,609 | 2/1984 | Warrender | 84/454 |
| 4,510,840 | 4/1985 | Inami et al. | 84/447 R |
| 4,607,528 | 8/1986 | Kallergis | 73/602 |
| 4,649,743 | 3/1987 | Sugimoto et al. | 73/162 |
| 4,676,111 | 6/1987 | Wagner et al. | 73/865.6 |
| 4,849,894 | 7/1989 | Probst | 364/413.01 |
| 5,321,636 | 6/1994 | Beerends | 364/485 |
| 5,359,662 | 10/1994 | Yuan et al. | 381/71 |
| 5,400,261 | 3/1995 | Reynolds | 364/487 |
| 5,418,857 | 5/1995 | Eatwell | 381/71 |
| 5,426,704 | 6/1995 | Tamamura et al. | 381/71 |
| 5,426,705 | 6/1995 | Yokota et al. | 381/71 |
| 5,430,241 | 7/1995 | Furuhashi et al. | 84/603 |
| 5,534,697 | 7/1996 | Creekmore et al. | 250/332 |
| 5,535,131 | 7/1996 | Sanders | 364/487 |

Primary Examiner—James P. Trammell

[57] ABSTRACT

A computer-implemented system for analyzing sound quality in automobiles includes a noise spectrum generator that generates an actual or synthetic noise spectrum representative of the noise of an automobile. A computer receives the spectrum and converts frequencies at predetermined intervals to corresponding frequency orders, relative to a fundamental frequency, e.g., the RPM of the automobile's engine. Then, each order and/or the difference between the order and one or more comparison orders is determined and correlated to a corresponding musical interval. Each interval is assigned a weighting factor, based upon its agreeability to the human ear, and the weighting factor is multiplied by the amplitude (SPL) of the order to generate a measure which represents the sound quality of the noise spectrum. The measure includes components related to roughness, dissonance, sharpness, and boom.

16 Claims, 2 Drawing Sheets

SYSTEM FOR ANALYZING SOUND QUALITY IN AUTOMOBILES USING MUSICAL INTERVALS

FIELD OF INVENTION

The present invention relates generally to automobile sound quality, and more particularly to methods and apparatus for analyzing the sound quality of automobiles.

BACKGROUND OF THE INVENTION

In my U.S. Pat. No. 5,535,131 I observed that automobile consumers are becoming increasingly demanding of automobile performance, including aesthetic/ergonomic performance. Of importance to both my previous patent and the present invention is the aesthetic and ergonomic considerations of automobile noise, and more particularly, of the sound quality of the automobile noise spectrum in the passenger compartment of automobiles. Unduly annoying automobile noise, including, e.g., drive train noise, adversely influences the perceptions potential consumers have of the automobile. In contrast, a pleasant sounding automobile is desirable to many consumers.

Whether an automobile possesses pleasant sound quality only partly depends on the sound pressure level (i.e., the loudness) of the noise in the passenger compartment. The quality of the noise also bears importantly on whether the automobile will be positively or negatively perceived by a consumer. Not surprisingly, however, what constitutes good and bad sound quality is subjective, because the answer depends on human psychoacoustics. Nevertheless, as recognized by the present invention, the determination of the sound quality of an automobile must account for human psychoacoustics, because human consumers ultimately will be the judges of whether an automobile sounds agreeable or disagreeable.

To quantify automobile sound quality, efforts have been made to correlate automobile noise patterns with what test subjects regard as agreeable and disagreeable noise. Essentially, these efforts have required that human test subjects listen to automobile noises and then subjectively rank the various noises. The rankings are then statistically analyzed to rank particular sound characteristics on a scale of agreeability.

Unfortunately, the rankings tend to be somewhat ad hoc, derived, as they are, from a limited number of subjects and a limited number of recordings. Further, individual rating "systems" vary somewhat, person to person. Thus, such test results are not repeatable, in that one test can potentially indicate a sound characteristic to be relatively agreeable, and another test can potentially indicate the same sound characteristic to be relatively disagreeable.

Still further, methods that employ human test subjects are largely incapable of predicting the sound quality of proposed automobile designs, until a prototype of the proposed design can be built and its sound recorded and graded by human test subjects. Accordingly, as recognized by the present invention, it would be advantageous to determine the sound quality of the noise spectra of both existing and proposed automobiles based on the psychoacoustic agreeability of the noise spectra, without requiring the input of human test subjects.

In my above-referenced patent, I provide a method and apparatus for analyzing automobile sound quality which is objective and which does not require interactive human ranking of sound quality. The novel method and apparatus provided herein further refines the sound quality analysis.

It is therefore an object of the present invention to provide a method and apparatus for analyzing automobile sound quality which is objective and which does not require interactive human ranking of sound quality. Another object of the present invention is to provide a method and apparatus for analyzing automobile sound quality which accounts for human psychoacoustic judgement of sound. Still another object of the present invention is to provide a method and apparatus for analyzing automobile sound quality which is easy to use and cost-effective.

SUMMARY OF THE INVENTION

A program storage device is disclosed which is readable by a digital processing apparatus and which tangibly embodies a program of instructions executable by the digital processing apparatus to perform method steps for analyzing the quality of an automobile noise spectrum. The noise spectrum is characterized by at least one fundamental sound frequency, and the method steps includes generating a noise spectrum, preferably processed by a fast Fourier transform, that is representative of an automobile's sound. Then, frequencies of elements of the spectrum are identified at predetermined intervals.

Next, the frequencies are related to the fundamental frequency to establish respective fundamental relationships, and each fundamental relationship is correlated to a musical scale interval. One or more respective weighting factors are assigned to each frequency based upon the musical scale interval, and a measure of the quality of the automobile noise spectrum is output in response.

Preferably, the frequencies are related to the fundamental frequency by converting the frequencies to orders relative to the fundamental frequency, with the predetermined interval being ½ order. In the preferred embodiment, the method further includes determining the product of the weighting factor and the sound pressure level of each order, prior to the outputting step, to establish a measure representative of the sound quality of the noise spectrum.

The assigning step may be accomplished by assigning a dissonance weighting factor, a roughness weighting factor, and a sharpness weighting factor to some of the orders, and assigning a dissonance weighting factor, a roughness weighting factor, and a boom value to some of the orders. Preferably, the assigning step includes assigning boom factors to orders having frequencies between eighty Hertz and three hundred Hertz, inclusive ($80 \text{ Hz} \leq f_{thun} \leq 300 \text{ Hz}$), and assigning sharpness values to orders with frequencies $f_{ord}$ that are at least equal to five hundred Hertz ($f_{ord} \geq 500 \text{ Hz}$). In assigning the boom factors, the sound pressure level (SPL) of the relevant orders are raised to a predetermined power and then multiplied by a predetermined non-musical boom weighting factor, to render a boom measure for the relevant orders.

Additionally, the method steps undertaken by the program storage device include correlating each order to a musical interval and assigning the order a dissonance cacoph measure based upon the musical interval, and assigning to some of the orders a sharpness acum measure based upon the musical interval. A roughness asper measure is assigned to some of the orders. The roughness, dissonance, sharpness and boom measures are summed and multiplied by respective roughness, dissonance, sharpness and boom coefficients, wherein the sum of the roughness, dissonance, sharpness and boom coefficients equals one.

In another aspect of the present invention, a system for determining the sound quality of an automobile includes a noise spectrum generator and a frequency identifier operably connected to the noise spectrum generator for identifying frequencies in the spectrum for determining a musical interval representative of the relationship between at least one frequency and a comparison frequency. An output device outputs a signal representative of the sound quality of the automobile based upon the musical interval.

In still another aspect, a system is disclosed for analyzing a noise spectrum. The system includes means for generating a noise spectrum representative of an automobile's sound, and means for identifying frequencies of elements of the spectrum. Means are provided for relating the frequencies to the fundamental frequency to establish respective fundamental relationships. Also, means are disclosed For correlating each fundamental relationship to a musical scale interval, and means assign sharpness, dissonance, roughness, and boom measures to each frequency, with at least some of the measures being based on the music scale interval. A measure of the quality of the automobile noise spectrum is output in response to the assigning means.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
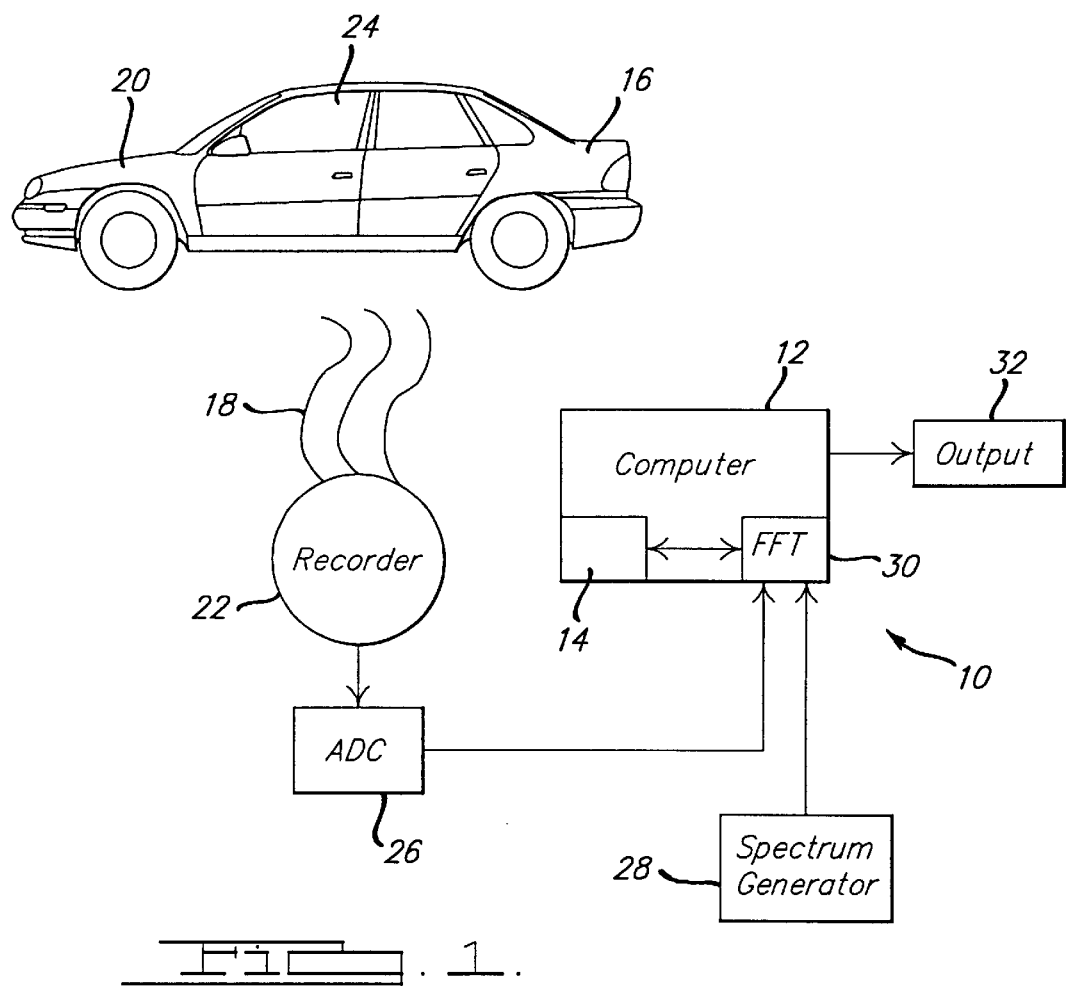
FIG. 1 is a schematic diagram of the system for analyzing automobile sound quality of the present invention.

Referring initially to FIG. 1, a system for analyzing automobile sound quality is shown, generally designated 10. As shown, the system 10 includes a data processing computer 12 and an associated program storage device 14. In the presently preferred embodiment, the computer 12 is an IBM-compatible 486 or Pentium® personal computer or notebook computer. Alternatively, the computer 12 can be another suitable data processing apparatus, such as a computer made by Apple Computer.

In accordance with the present invention and as disclosed in detail below, the system 10 analogizes an actual or synthetic automobile noise spectrum to musical tones, and based upon the analogy, outputs a measure of sound quality. In its broadest sense, the system 10 determines four parameters of the noise spectrum, namely, dissonance, roughness, sharpness, and boom, and then multiplies the parameters by respective empirically-determined coefficients (D, N, S and B as discussed herein) to arrive at a numeric value that is a measure of the sound quality of the noise spectrum. In other words, the computer 12 receives a noise spectrum and converts at least portions of the noise spectrum to corresponding musical intervals, to analyze the sound quality of the noise spectrum.

As envisioned by the present invention, the program storage device 14 may be implemented by a processor within the computer 12 that executes a series of computer-executable instructions. These instructions may reside, for example, in RAM and/or ROM of the computer 12. Alternatively, the instructions may be contained on a data storage medium, such as a computer diskette. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ language code.

As shown in FIG. 1, noise (represented by wave lines 18) which emanates from, e.g., an engine 20 of the automobile 16, is recorded on a recording apparatus 22. The recording apparatus 22 may be any suitable sound recorder that uses a suitable recording medium, e.g., magnetic tape or optical disk. In the presently preferred embodiment, the recording apparatus 22 is a digital audio recorder which records complex sound.

As intended by the present invention, the noise of the engine 20 as recorded by the recording apparatus 22 is essentially the noise that propagates into a passenger compartment 24 of the automobile 16. Accordingly, the recording apparatus 22 may be physically located inside the passenger compartment 24, or at any other location at which it is desired to record the noise of the automobile 16.

As further shown in FIG. 1, the recording apparatus 22 is electrically connected to an analog to digital converter (ADC) 26. Desirably, the ADC 26 is incorporated with the recording apparatus 22. In any case, the recording apparatus 22 with ADC 26 generates a signal representative of the noise spectrum of the automobile 16.

Alternatively, a noise spectrum may be synthetically generated by a simulated spectrum generator 28. The synthetic spectrum generator 28 can be a computer which calculates a hypothetical noise spectrum in accordance with an appropriate automobile noise algorithm. Thus, as the skilled artisan will recognize, the noise spectrum analyzed by the system 10 need not be the spectrum of an automobile, but may instead be a synthetic spectrum, i.e., the spectrum of a hypothetical automobile. Thereby, the agreeability of the noise of proposed new automobile designs may be analyzed by the system 10, without first requiring that prototypes of the proposed new automobile designs be first constructed prior to testing for noise agreeability. Substantial design efficiency and cost effectiveness can be gained as a result.

In either case, a noise spectrum is generated by either the engine 20 or synthetic spectrum generator 28 and then sent to a fast Fourier transformer (FFT) 30, which advantageously may be embodied in software of the computer 12. The FFT is any suitable device well-known in the art, such as the Binaural Analysis System made by Head Acoustics, which outputs a signal representative of the frequency distributed sound pressure level (SPL) of the noise spectrum sought to be analyzed.

As further disclosed below, the system 10 generates a signal representative of the sound quality of the noise spectrum being analyzed. An output device 32 is electrically connected to the computer 12 for outputting a display of the signal. The output device 32 may be any suitable output device, e.g., an audio or visual display, such as a computer monitor, computer printer, or other computers and/or electronic data storage media.

Figure 2:
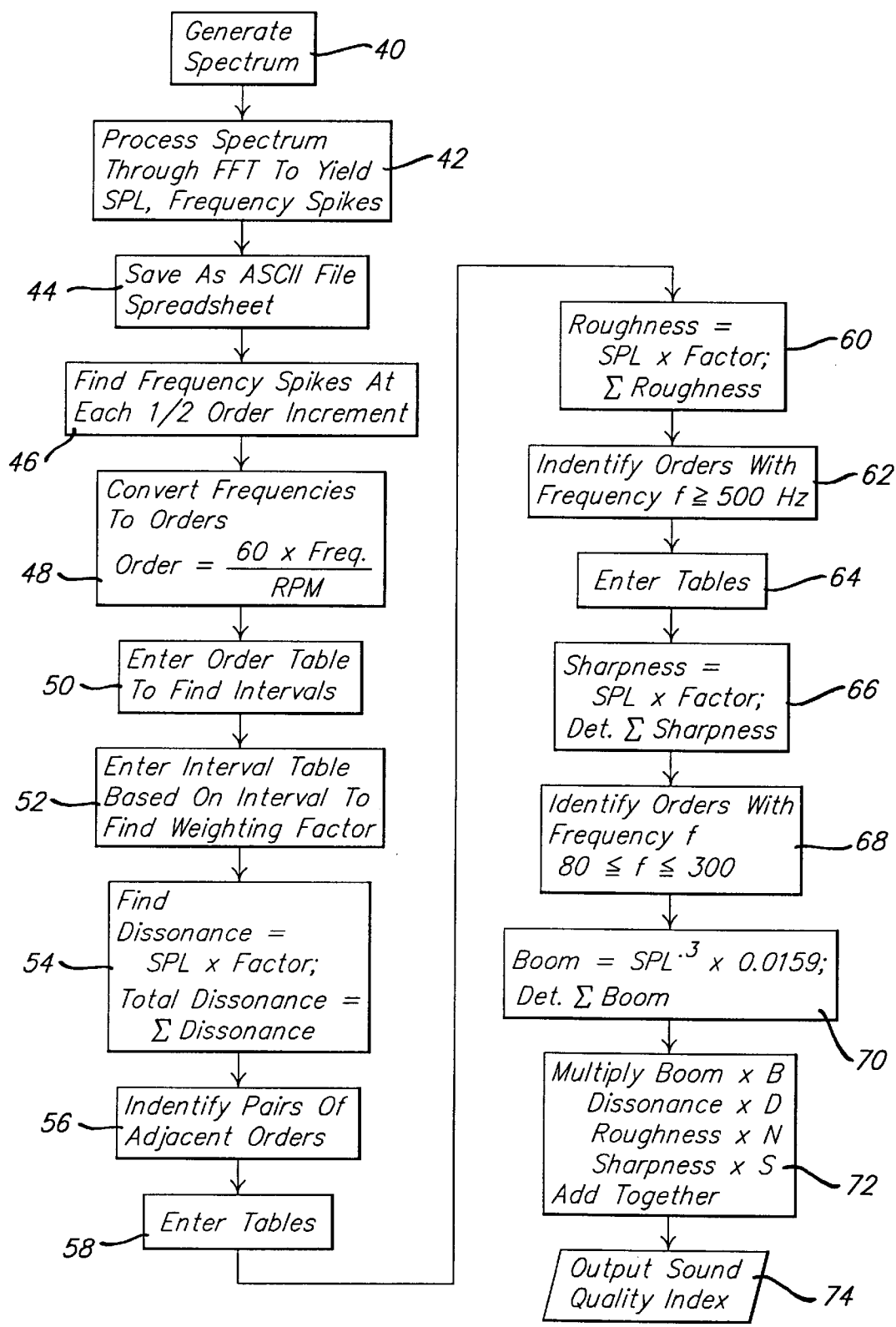
FIG. 2 is a flow chart of the logic of the present invention.

Now referring to FIG. 2, the method steps of the computer 12 with program storage device 14 in analyzing the agreeability of automobile noise spectrums can be seen. As mentioned above, a noise spectrum is first generated at block 40, either by recording the generated sound of the automobile 16 or artificially, e.g., by the synthetic spectrum generator 28. The spectrum is then sent to the FFT 30 at block 42, and the FFT 30 generates an output of sound pressure level (SPL) vs. frequency for the noise spectrum. The transformed spectrum is saved at block 44 as an ASCII spreadsheet file, preferably using the Lotus® spreadsheet program made by Borland.

At block 46, the computer 12 finds all frequency spikes in the noise spectrum that have an associated SPL that is greater than a predetermined threshold SPL. Thus, block 46 establishes a frequency identifier which identifies frequencies having SPL's greater than a threshold SPL.

At block 48, each frequency spike from block 46 is related to the fundamental dominant frequency of the noise spectrum, preferably by converting each frequency to an order. In accordance with the present invention, an order is characterized by a numeric value which is determined by multiplying the associated frequency to be converted by 60 and then dividing by the angular velocity (i.e., the RPM) of the machinery being analyzed, e.g., the engine 20 shown in FIG. 1. Thereby, each frequency is related to a predetermined frequency, preferably the fundamental dominant frequency that is defined in the example disclosed by the engine 20.

Accordingly, it will be appreciated that when the order value of a frequency is an integer "n", the order is an $n^{th}$ order harmonic of the fundamental frequency defined by the machinery. Stated differently, block 48 analogizes the noise spectrum to musical tones which correspond to spikes in the spectrum.

Next, at block 50, for each order, the musical interval (e.g., minor third, fifth, etc.) between it and the fundamental is determined by the computer 12 by entering an order table with the order value as the entering argument. Table 1 is an example of the presently preferred order table of the present invention. For orders having values between entries in the order column of Table 1, the value of the order is rounded to nearest order value that is represented in Table 1. Thus, block 50 establishes an interval determiner.

Essentially, each order under test is a test order which represents a corresponding test frequency from the noise spectrum, with the fundamental frequency being represented by a comparison order. In determining the musical interval at block 50, the computer 12 selects a sharpness/dissonance interval in the sharpness/dissonance (second) column of the order table that corresponds to an entering argument based on the difference between the test order and the fundamental. The skilled artisan will recognize that the tabular determination of the musical interval can be replaced with a computational determination.

After determining the musical sharpness/dissonance intervals corresponding to the orders at block 50, the computer 12 enters a dissonance/sharpness interval table at block 52 with each interval determined at block 50 as the entering argument to find an empirically determined weighting factor for dissonance. Table 2 is an example of the presently preferred dissonance/sharpness interval table.

Table 2 identifies, for a given interval, one or more weighting factors. In the embodiment shown, Table 2 provides weighting factors for the dissonance and sharpness determinations discussed below, while Table 3 provides combined weighting factors for the roughness determination discussed below. Using Table 2 at block 52, a particular interval is assigned a dissonance weighting factor, depending upon the frequency of the order. More particularly, a first dissonance weighting factor is assigned if the frequency of the order is less than 500 Hz, and a second dissonance weighting factor is assigned if the frequency of the order is greater than 500 Hz but less than 1200 Hz. Still further, a third dissonance weighting factor is assigned if the frequency of the order is greater than 1200 Hz.

It is to be understood that the weighting factors shown in Tables 2 and 3 are empirically determined to accord with human psychoacoustic preferences, as indicated by the results of calibration tests which use human test subjects. Thus, the present invention avoids the need to use human test subjects to grade the agreeability of each and every noise spectrum sought to be analyzed. Rather, the present invention requires human interaction only to develop and refine Table 2. Accordingly, Tables 2 and 3 essentially establish a psychoacoustic standard against which the agreeability of noise spectra may be measured.

While the above-disclosed method is perhaps the simplest and most elegant way to convert the noise spectrum to corresponding musical intervals, other methods may be used. For example, instead of first converting the frequencies to orders to relate the frequencies to the fundamental prior to entering the interval table, the difference or ratio between selected frequencies may be first determined prior to relating the frequencies to the fundamental. Then, one of a set of frequency tables can be entered to determine a musical interval. It will be recognized that in such an embodiment, each frequency table in the set of frequency tables would represent a particular fundamental frequency. Consequently, the proper frequency table would be selected based upon the fundamental frequency, thereby effectively relating the frequencies to the fundamental after a frequency difference or ratio has been determined. The skilled artisan will recognize, however, that the preferred embodiment shown in FIG. 2 avoids the need for a multiplicity of frequency tables by first converting frequencies to orders, i.e., by first relating the frequencies to the fundamental, prior to entering a single interval table.

Next, the dissonance of each order in the noise spectrum relative to the fundamental dominant frequency is determined at block 54 by multiplying the order's SPL and the combined dissonance/sharpness weighting factor determined at block 52. Per the present invention, the product of block 54 is a cacophony measure that is expressed in "cacophs", wherein one cacoph is equal to a 60 db tone at one kiloHertz (1 kHz) with 100% modulation and characterized by the fundamental frequency. The step at block 54 is repeated for each order and the individual dissonances summed to determine an overall dissonance cacoph value, i.e., to determine total dissonance.

Roughness is next determined at blocks 56–60. As envisioned by the present invention, while the dissonance of the noise spectrum disclosed above is concerned with the discordances arising from the relationship of each of the individual frequency spikes with the fundamental dominant frequency, as reflected by the respective orders, roughness is concerned with discordances arising from pairs of immediately adjacent orders. More specifically, at block 56, pairs of immediately adjacent orders are identified. For each of the two adjacent orders in each pair, Table 1 is entered at block 58 with the order as the entering argument, and the corresponding weighting factor is selected from the third or fourth column, as appropriate for the difference (i.e., ½ order or one full order) between adjacent intervals. It happens that for most automobile noise spectra, adjacent orders are spaced either by one-half of an order, in which case the corresponding weighting factor is selected from the third column of the order table, or adjacent orders are spaced by one full order, in which case the corresponding weighting factor is selected from the fourth column of the order table. When the spacing between adjacent orders in a pair is not equal to ½ order or one full order, the spacing is rounded to the nearest of ½ order or one full order. Then, the interval table is entered as before to determine a weighting factor.

Proceeding with the determination of roughness, the weighting factor is multiplied by the SPL of the order at block 60 to determine a roughness measure. As was the case with dissonance, the individual roughness measures are summed to determine an overall roughness value in "aspers", i.e., to determine total roughness.

At blocks 62–70, two metrics in addition to dissonance and roughness are determined. More specifically, blocks 62–66 determine a metric referred to herein as "sharpness", in units of "acum", wherein one acum is a narrow-band noise centered at one kiloHertz (1 kHz), a bandwidth of less than one hundred fifty Hertz (<150 Hz), and a sound pressure level of sixty decibels (SPL+60 db). On the other hand, blocks 68–70 determine a novel metric referred to herein as "boom", in units of "thun", wherein one "thun" is a sixty decibel (60 db) tone having a frequency between eighty Hertz and three hundred Hertz, inclusive (80 Hz<$f_{thun}$<300 Hz).

At block 62, orders with frequencies $f_{ord}$ that are at least equal to five hundred Hertz ($f_{ord}$>500 Hz) are selected. The appropriate frequency range column in Table 3 is then entered at block 64 using, as an entering argument, the sharpness/dissonance interval from Table 1, to thereby determine a sharpness weighting factor. At block 66, the sharpness weighting factor is multiplied by the SPL of the order to determine a sharpness measure. At block 66, as was the case with dissonance and roughness, the individual sharpness measures are summed to determine an overall sharpness value in "acums", i.e., to determine total sharpness.

Turning to the novel metric "boom", at block 68, orders having frequencies between eighty Hertz and three hundred Hertz, inclusive (80 Hz<$f_{thun}$<300 Hz) are selected at ½ order intervals. Next, at block 70, for each order selected at block 68 a "boom" value is determined by raising the SPL of the order to a predetermined power, and then multiplying by a predetermined non-musical boom weighting factor. In the preferred embodiment, the predetermined power is three-tenths (0.3) and the predetermined non-musical boom weighting factor is one hundred fifty nine ten thousandths (0.0159). At block 70, the individual boom measures are summed to determine an overall boom value in "thuns", i.e., to determine total boom.

At block 72, the value for total boom is multiplied by an empirically determined boom coefficient B. Likewise, the value for total dissonance is multiplied by an empirically determined dissonance coefficient D, the value for total roughness is multiplied by an empirically determined roughness coefficient N, and the value for total sharpness is multiplied by an empirically determined sharpness coefficient S, wherein R+D+N+S=1. In the presently preferred embodiment, the value for the sharpness coefficient S is equal to 0.15, the value for the dissonance coefficient D is equal to 0.10, the value for the roughness coefficient N is equal to 0.95, and the value for the boom coefficient B is equal to 0.10. In the presently preferred embodiment, the sum of the four terms determined at block 72 is then output at block 74 as an index of sound quality, with the higher the index indicating the lower sound quality.

While the particular SYSTEM FOR ANALYZING SOUND QUALITY IN AUTOMOBILES USING MUSICAL INTERVALS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

TABLE 1

| Order | Sharpness & Dissonance Interval | Roughness Interval | Interval |
|---|---|---|---|
| 0.5 | P8 | (½ Ord) | (Full Ord) |
| 1 | P8 | P8 | |
| 1.5 | P5 | P5 | P8 |
| 2 | P1 | P4 | P8 |
| 2.5 | M3 | M3 | M6 |
| 3 | P5 | m3 | P5 |
| 3.5 | M7 | m3 | dim5 |
| 4 | P8 | M2 | P4 |
| 4.5 | M2 | M2 | M3 |
| 5 | M3 | M2 | M3 |
| 5.5 | dim5 | M2 | m3 |
| 6 | P5 | m2 | m3 |
| 6.5 | m5 | m2 | m3 |
| 7 | m7 | m2 | m3 |
| 7.5 | M7 | m2 | M2 |
| 8 | P8 | m2 | M2 |
| 8.5 | m2 | m2 | M2 |
| 9 | M2 | m2 | M2 |
| 9.5 | m3 | m2 | M2 |
| 10 | M3 | m2 | M2 |
| 10.5 | P4 | m2 | M2 |
| 11 | dim5 | m2 | M2 |
| 11.5 | dim5 | m2 | m2 |
| 12 | P5 | m2 | m2 |
| 12.5 | m6 | m2 | m2 |
| 13 | m6 | m2 | m2 |
| 13.5 | M6 | m2 | m2 |
| 14 | m7 | m2 | m2 |
| 14.5 | m7 | m2 | m2 |
| 15 | M7 | m2 | m2 |
| 15.5 | M7 | m2 | m2 |
| 16 | P8 | m2 | m2 |
| 16.5 | m2 | m2 | m2 |
| 17 | m2 | m2 | m2 |
| 17.5 | m2 | P1 | m2 |
| 18 | M2 | P1 | m2 |
| 18.5 | M2 | P1 | m2 |
| 19 | m3 | P1 | m2 |
| 19.5 | m3 | P1 | m2 |
| 20 | M3 | P1 | m2 |
| 20.5 | M3 | P1 | m2 |
| 21 | P4 | P1 | m2 |
| 21.5 | P4 | P1 | m2 |
| 22 | dim5 | P1 | m2 |
| 22.5 | dims | P1 | m2 |
| 23 | dim5 | P1 | m2 |
| 23.5 | P5 | P1 | m2 |
| 24 | P5 | P1 | m2 |
| 24.5 | P5 | P1 | m2 |
| 25 | m6 | P1 | m2 |

TABLE 2

(Factors: Sharpness/Dissonance)

| INTERVAL | IF f < 500 | IF f >= 500 | IF f >= 1200 |
|---|---|---|---|
| P1 | 1.47E-08 | 2.08E-08 | 2.94E-08 |
| P8 | 2.08E-08 | 2.94E-08 | 4.15E-08 |
| P5 | 2.94E-08 | 4.15E-08 | 5.86E-08 |
| P4 | 4.15E-08 | 5.86E-08 | 8.27E-08 |
| M3 | 5.86E-08 | 8.27E-08 | 1.17E-07 |
| M6 | 8.27E-08 | 1.17E-07 | 1.65E-07 |
| m3 | 1.17E-07 | 1.65E-07 | 2.33E-07 |
| m6 | 1.65E-07 | 2.33E-07 | 3.29E-07 |
| m7 | 2.33E-07 | 3.29E-07 | 4.65E-07 |
| M2 | 3.29E-07 | 4.65E-07 | 6.57E-07 |
| dim5 | 4.65E-07 | 6.57E-07 | 9.28E-07 |
| M7 | 6.57E-07 | 9.28E-07 | 1.31E-06 |
| m2 | 9.28E-07 | 1.31E-06 | 1.85E-06 |

TABLE 3

Factors (Roughness)

| INTERVAL | IF f < 500 | IF f >= 500 | IF f >= 1200 |
|---|---|---|---|
| P1 | 9.32E-09 | 1.32E-08 | 1.86E-08 |
| P8 | 1.32E-08 | 1.86E-08 | 2.63E-08 |
| P5 | 1.86E-08 | 2.63E-08 | 3.71E-08 |
| P4 | 2.63E-08 | 3.71E-08 | 5.24E-08 |
| M3 | 3.71E-08 | 5.24E-08 | 7.40E-08 |
| M6 | 5.24E-08 | 7.40E-08 | 1.05E-07 |
| m3 | 7.40E-08 | 1.05E-07 | 1.48E-07 |
| m6 | 1.05E-07 | 1.48E-07 | 2.09E-07 |
| m7 | 1.48E-07 | 2.09E-07 | 2.95E-07 |
| M2 | 2.09E-07 | 2.95E-07 | 4.16E-07 |
| dim5 | 2.95E-07 | 4.16E-07 | 5.88E-07 |
| M7 | 4.16E-07 | 5.88E-07 | 8.30E-07 |
| m2 | 5.88E-07 | 8.30E-07 | 1.17E-06 |

I claim:

1. A program storage device readable by a digital processing apparatus and tangibly embodying a program of instructions executable by the digital processing apparatus to perform method steps for analyzing the quality of an automobile noise spectrum, wherein the spectrum is characterized by at least one fundamental sound frequency, the method steps comprising:

generating a noise spectrum representative of an automobile's sound;

identifying frequencies of elements of the spectrum;

relating the frequencies to the fundamental frequency to establish respective fundamental relationships;

correlating each fundamental relationship to a musical scale interval;

assigning one or more respective weighting factors to each frequency based upon the musical scale interval; and outputting a measure of the quality of the automobile noise spectrum in response to the assigning step.

2. The program storage device of claim 1, wherein the frequencies are related to the fundamental frequency by converting the frequencies to orders relative to the fundamental frequency, and the method further comprises the step of determining the product of the weighting factor and the sound pressure level of each order, prior to the outputting step, to establish a measure representative of the sound quality of the noise spectrum.

3. The program storage device of claim 2, wherein the assigning step includes assigning a dissonance weighting factor, a roughness weighting factor, and a sharpness weighting factor to some of the orders, and assigning a dissonance weighting factor, a roughness weighting factor, and a boom value to some of the orders.

4. The program storage device of claim 3, wherein the assigning step includes assigning boom factors to orders having frequencies between eighty Hertz and three hundred Hertz, inclusive (80 Hz<$f_{thun}$<300 Hz), and wherein sharpness values are determined for orders with frequencies $f_{ord}$ that are at least equal to five hundred Hertz ($f_{ord}$>500 Hz).

5. The program storage device of claim 4, wherein the assigning boom factors step includes raising the sound pressure level (SPL) to a predetermined power and multiplying it by a predetermined non-musical boom weighting factor, render a boom measure for the order.

6. The program storage device of claim 5, wherein the method steps further comprise:

correlating each order to a musical interval and assigning the order a dissonance cacoph measure based upon the musical interval;

correlating each order to a musical interval and assigning to some of the orders a sharpness acum measure based upon the musical interval; and assigning a roughness asper measure to some of the orders.

7. The program storage device of claim 6, wherein the method steps further comprise the step of summing the roughness, dissonance, sharpness and boom measures and multiplying the summed measures by respective roughness, dissonance, sharpness and boom coefficients, wherein the sum of the roughness, dissonance, sharpness and boom coefficients equals one.

8. A method for analyzing the quality of an automobile noise spectrum, wherein the spectrum is characterized by at least one fundamental sound frequency, comprising:

generating a noise spectrum representative of an automobile's sound;

identifying frequencies of elements of the spectrum;

relating the frequencies to the fundamental frequency to establish respective fundamental relationships;

correlating each fundamental relationship to a musical scale interval;

assigning one or more respective weighting factors to each frequency based upon the musical scale interval; and outputting a measure of the quality of the automobile noise spectrum in response to the assigning step.

9. The method of claim 8, wherein the frequencies are related to the fundamental frequency by converting the frequencies to orders relative to the fundamental dominant frequency, and the method further comprises the step of determining the product of the weighting factor and the sound pressure level of each order, prior to the outputting step, to establish a cacoph measure representative of the sound quality of the noise spectrum.

10. The method of claim 9, wherein the correlating step is accomplished by assigning a dissonance weighting factor, a roughness weighting factor, and a sharpness weighting factor to some of the orders, and assigning a dissonance weighting factor, a roughness weighting factor, and a boom value to some of the orders.

11. The method of claim 10, wherein the assigning step includes assigning boom factors to orders having frequencies between eighty Hertz and three hundred Hertz, inclusive (80 Hz≦$f_{thun}$≦300 Hz), and wherein sharpness values are determined for orders with frequencies $f_{ord}$ that are at least equal to five hundred Hertz ($f_{ord}$≧500 Hz).

12. The method of claim 11, wherein the assigning boom factors step includes raising the sound pressure level (SPL) to a predetermined power and multiplying it by a predetermined non-musical boom weighting factor, render a boom measure for the order.

13. The method of claim 12, further comprising:

correlating each order to a musical interval and assigning the order a dissonance cacoph measure based upon the musical interval;

correlating each order to a musical interval and assigning to some of the orders a sharpness acum measure based upon the musical interval; and assigning a roughness asper measure to some of the orders.

14. The method of claim 13, further comprising the step of summing the roughness, dissonance, sharpness and boom measures and multiplying the summed measures by respective roughness, dissonance, sharpness and boom coefficients, wherein the sum of the roughness, dissonance, sharpness and boom coefficients equals one.

15. A system for determining the sound quality of an automobile, comprising:

a noise spectrum generator;

a frequency identifier operably connected to the noise spectrum generator for identifying frequencies in the spectrum an interval determiner operably connected with the frequency identifier for determining a musical interval representative of the relationship between at least one frequency and a comparison frequency; and an output device for outputting a signal representative of the sound quality of the automobile based upon the musical interval.

16. A system for analyzing a noise spectrum, comprising:

means for generating a noise spectrum representative of an automobile's sound;

means for identifying frequencies of elements of the spectrum;

means for relating the frequencies to the fundamental frequency to establish respective fundamental relationships;

means for correlating each fundamental relationship to a musical scale interval;

means for assigning sharpness, dissonance, roughness, and boom measures to each frequency, at least some of the measures being based on the music scale interval; and means for outputting a measure of the quality of the automobile noise spectrum in response to the assigning step.

* * * * *